United States Patent
Indiradevi et al.

(10) Patent No.: US 11,184,191 B1
(45) Date of Patent: Nov. 23, 2021

(54) INSPECTION OF NETWORK TRAFFIC ON ACCELERATED PLATFORMS

(71) Applicant: Trend Micro Incorporated, Tokyo (JP)

(72) Inventors: Salim SreeNarayanapillai Indiradevi, Taipei (TW); Ryan Pan, Taipei (TW)

(73) Assignee: Trend Micro Incorporated, Tokyo (JP)

( * ) Notice: Subject to any disclaimer, the term of this patent is extended or adjusted under 35 U.S.C. 154(b) by 250 days.

(21) Appl. No.: 16/597,135

(22) Filed: Oct. 9, 2019

Related U.S. Application Data

(60) Provisional application No. 62/899,527, filed on Sep. 12, 2019.

(51) Int. Cl.
*H04L 29/06* (2006.01)
*H04L 12/46* (2006.01)

(52) U.S. Cl.
CPC ...... *H04L 12/4641* (2013.01); *H04L 12/4633* (2013.01); *H04L 29/06* (2013.01); *H04L 63/0272* (2013.01); *H04L 63/20* (2013.01)

(58) Field of Classification Search
CPC .......... H04L 29/0653; H04L 29/06095; H04L 49/3009; H04L 49/309; H04L 45/74; H04L 12/4641; H04L 12/4633; H04L 29/06; H04L 63/20; H04L 63/0272
See application file for complete search history.

(56) References Cited

U.S. PATENT DOCUMENTS

| | | | |
|---|---|---|---|
| 7,885,257 B2* | 2/2011 | Droux | H04L 12/4641 370/389 |
| 7,996,894 B1* | 8/2011 | Chen | H04L 63/08 726/22 |
| 8,018,873 B1* | 9/2011 | Kompella | H04L 45/00 370/254 |
| 9,936,047 B2* | 4/2018 | Adolph | H04L 41/5051 |
| 10,177,998 B2* | 1/2019 | Parandehgheibi | G06F 16/122 |
| 10,257,166 B2 | 4/2019 | Tsirkin | |
| 10,320,674 B2 | 6/2019 | Benny | |
| 10,389,835 B2 | 8/2019 | Jalan et al. | |
| 10,587,576 B2* | 3/2020 | Cooper | H04L 63/0209 |
| 11,088,939 B1* | 8/2021 | Manur | H04L 45/124 |
| 2004/0054813 A1* | 3/2004 | Boucher | H04L 69/16 709/250 |

(Continued)

*Primary Examiner* — Hassan A Phillips
*Assistant Examiner* — Prenell P Jones
(74) *Attorney, Agent, or Firm* — Patrick D. Benedicto

(57) ABSTRACT

A network security device has a local area network (LAN) interface and a wide area network (WAN) interface, with a capability to route packets of a network connection along a fast path that bypasses a network stack of an operating system of the network security device. A packet of a network connection that is received at the LAN interface is routed to a virtual network interface. A packet inspector reads the packet from the virtual network interface, inspects the packet, and writes the packet back to the virtual network interface after inspection. The packet is routed from the virtual network interface to the WAN interface, and exits the WAN interface towards the destination network address of the packet. After inspecting one or more packets of the network connection, subsequently received packets of the network connection are routed along the fast path.

20 Claims, 8 Drawing Sheets

(56) References Cited

U.S. PATENT DOCUMENTS

| | | | |
|---|---|---|---|
| 2005/0063307 A1* | 3/2005 | Samuels | H04L 67/2876 370/235 |
| 2007/0239854 A1* | 10/2007 | Janakiraman | G06F 9/4856 709/218 |
| 2008/0019365 A1* | 1/2008 | Tripathi | H04L 12/4641 370/392 |
| 2008/0077694 A1* | 3/2008 | Nordmark | H04L 63/166 709/227 |
| 2008/0123536 A1* | 5/2008 | Johnson | H04L 41/12 370/241 |
| 2008/0151893 A1* | 6/2008 | Nordmark | H04L 45/60 370/392 |
| 2010/0050040 A1* | 2/2010 | Samuels | H04L 67/28 714/749 |
| 2010/0064129 A1* | 3/2010 | Honjo | H04L 63/0485 713/150 |
| 2013/0254361 A1* | 9/2013 | Liu | H04L 61/609 709/223 |
| 2018/0041470 A1* | 2/2018 | Schultz | H04L 47/24 |
| 2018/0041477 A1* | 2/2018 | Shaposhnik | G06F 21/53 |
| 2018/0152366 A1* | 5/2018 | Cornett | H04L 67/10 |
| 2019/0089557 A1* | 3/2019 | Sung | H04L 12/4633 |
| 2020/0106740 A1* | 4/2020 | Bangalore Krishnamurthy | H04L 63/0227 |
| 2020/0213224 A1* | 7/2020 | Cheng | H04L 45/42 |
| 2020/0213225 A1* | 7/2020 | Han | H04L 61/00 |
| 2020/0244482 A1* | 7/2020 | Sung | H04L 47/41 |
| 2021/0058271 A1* | 2/2021 | Sung | H04L 12/4633 |

* cited by examiner

INSPECTION OF NETWORK TRAFFIC ON ACCELERATED PLATFORMS

CROSS-REFERENCE TO RELATED APPLICATION

This application claims the benefit of U.S. Provisional Application No. 62/899,527, filed on Sep. 12, 2019, which is incorporated herein by reference in its entirety.

BACKGROUND OF THE INVENTION

1. Field of the Invention

The present invention relates generally to cybersecurity, and more particularly but not exclusively to inspection of network traffic.

2. Description of the Background Art

A network device may inspect network traffic between two computers by receiving the network traffic and forwarding packets of the network traffic to a packet inspection engine that is running on the network device. The packet inspection engine inspects the packets to enforce network policies. For example, the LINUX operating system may include the Netfilter framework, which facilitates various network traffic-related operations, such as packet routing, connection tracking, network address translation, and port translation. A network device running the LINUX operating system may use the Netfilter framework to hook and forward packets to the packet inspection engine for inspection. Another way of hooking and forwarding packets to the packet inspection engine is by using sockets, such as the Berkeley Packet Filter (BPF) and the Packet Capture library (libpcap) on the LINUX operating system.

The so-called "Fastpath" is an implementation of a fast path for routing packets received at a network device. A Fastpath implementation accelerates the speed at which packets are routed through the network device by bypassing the network stack of the operating system of the network device. The network stack, which is also referred to as the "protocol stack", comprises the layers of software that process network traffic. The network stack is a slow path for routing packets.

Fastpath may be implemented in hardware or software. A software Fastpath bypasses only parts of the network stack, whereas a hardware Fastpath completely bypasses the network stack, such as by using a separate network processing engine (NPE) or embedded microcode in the physical network interface (e.g., network interface card (NIC)). More particularly, in the LINUX operating system, a Fastpath allows packets, after one or more packet sampling, to be routed between physical network interfaces without going through the LINUX network stack, thereby preventing hooking of the packets for inspection by the inspection engine.

One way of performing packet inspection on accelerated platforms, i.e., network devices with Fastpath capability, is to work with integrated circuit (IC) vendors that implement Fastpath in their IC offerings. For example, the IC vendor may provide an application programming interface (API) for disabling, and enabling Fastpath in their ICs, so that packets to be inspected can go through the network stack. There are several problems with this approach, including that there is no standard implementation of Fastpath (i.e., will require working with different API's for different vendors), vendors charge license fees for usage of their API, and added maintenance cost of keeping up with changes to the API.

Another way of performing packet inspection on accelerated platforms is to redirect, to a local proxy server, packets that will go through the network device. However, this approach only works on a few layer 7 protocols (e.g., the Hypertext Transfer Protocol (HTTP)), will not work with encrypted payloads, and has low throughput.

SUMMARY

In one embodiment, a network security device has a local area network (LAN) interface and a wide area network (WAN) interface, with a capability to route packets of a network connection along a fast path that bypasses a network stack of an operating system of the network security device. A packet of a network connection that is received at the LAN interface is routed to a virtual network interface. A packet inspector reads the packet from the virtual network interface, inspects the packet, and writes the packet back to the virtual network interface after inspection. The packet is routed from the virtual network interface to the WAN interface, and exits the WAN interface towards the destination network address of the packet. After inspecting one or more packets of the network connection, subsequently received packets of the network connection are routed along the fast path.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of systems, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Embodiments of the present invention are described in the context of the Linux operating system as an example. As can be appreciated, embodiments of the present invention may be adapted to perform packet inspection on accelerated platforms that run other operating systems.

Figure 1:
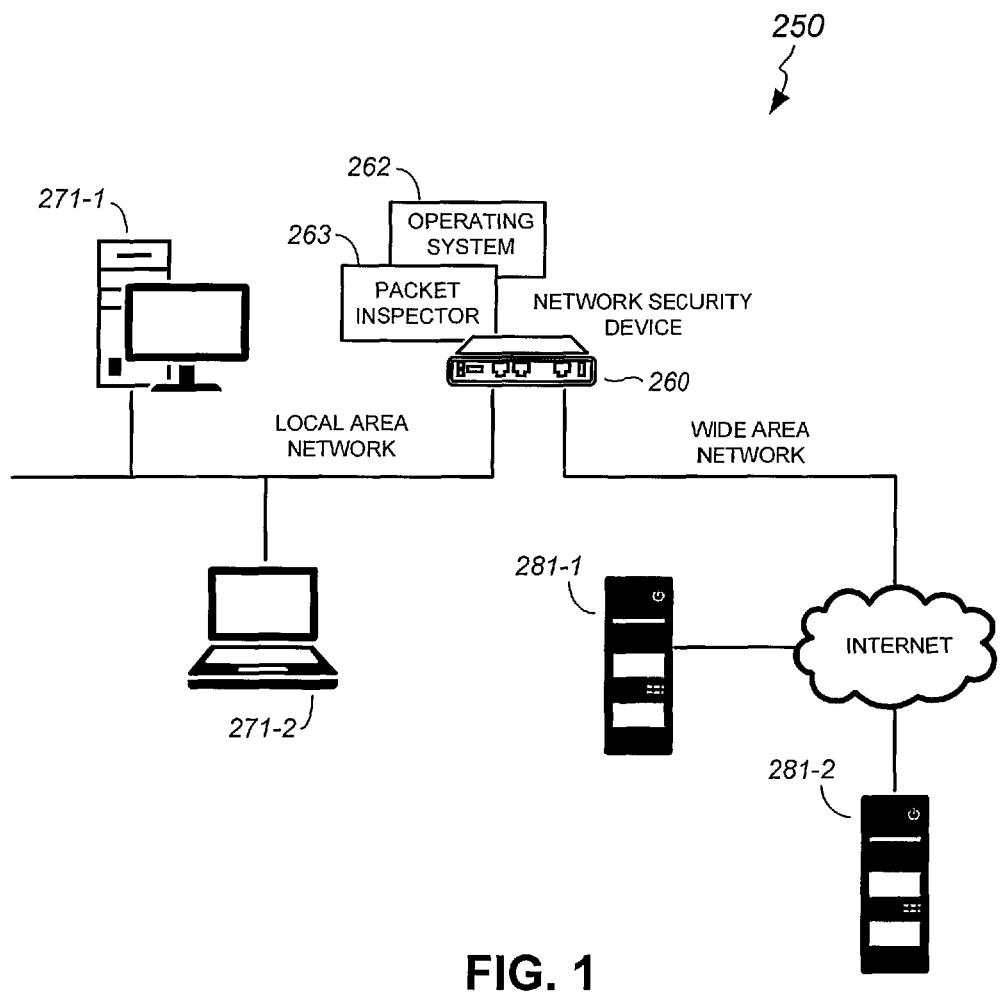
FIG. 1 shows a logical diagram of a computer network that includes a network security device in accordance with an embodiment of the present invention.

FIG. 1 shows a logical diagram of a computer network 250 in accordance with an embodiment of the present invention. In the example of FIG. 1, the computer network 250 includes a network security device 260 that connects a local area network (LAN) to a wide area network (WAN). The LAN may be a home network, i.e., a computer network of a private residence, for example. The LAN may have one or more computers 271 (i.e., 271-1, 271-2, . . . ) connected thereto. A computer 271 may be a laptop computer, desktop computer, or other computing device that communicates over a computer network.

The WAN may include the Internet. A computer 271 on the LAN may access a computer 281 (i.e., 281-1, 281-2, . . . ), such as a web server, on the Internet by connecting through the network security device 260. Computers of internet service providers and other intervening network devices, such as other routers, gateways, etc. are not shown for clarity of illustration.

The network security device 269 may be a router, gateway, a security appliance, or other network device that inspects network traffic to enforce network policies, e.g., to detect and prevent cyberattacks, enforce parental control restrictions, maintain quality of service (QoS), etc. In the example of FIG. 1, the network security device 269 comprises a home router that has a network interface for connecting to the LAN (also referred to herein as a "LAN interface") and another network interface for connecting to the WAN (also referred to herein as a "WAN interface"). The LAN and WAN interfaces are physical, i.e., hardware, interfaces.

The network security device 269 may be running an operating system 262, which in one embodiment is the LINUX operating system. A packet inspector 263 may be implemented as one or more software modules that run under the operating system 262. The packet inspector 263 may be configured to create a virtual interface that receives packets of network traffic that are received through a physical network interface, read the packets from the virtual interface, inspect the packets, and write the inspected packets to the virtual interface for forwarding to another physical network interface. The packet inspector 263 may be configured to perform a response action on one or more packets in accordance with network policies, such as blocking malicious packets, blocking packets that access a prohibited web service, restricting bandwidth of packets in accordance with QoS requirements, etc.

Figure 2:
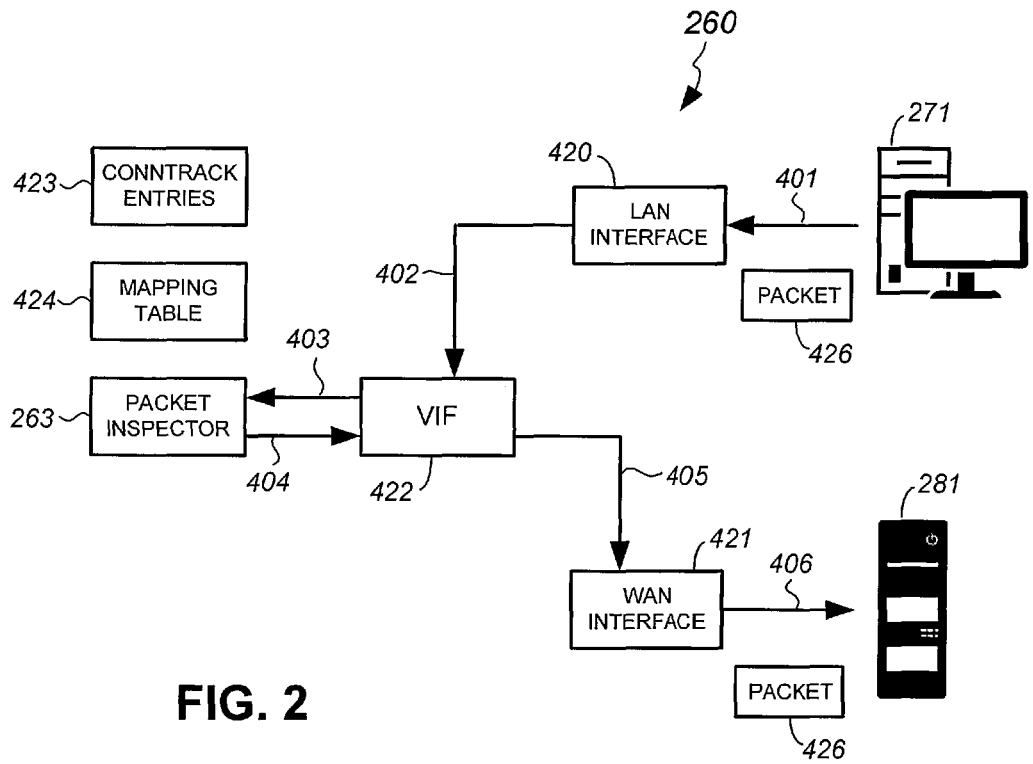
FIGS. 2-4 show logical diagrams that illustrate an example operation of the network security device of FIG. 1 in accordance with an embodiment of the present invention.
Figure 3:
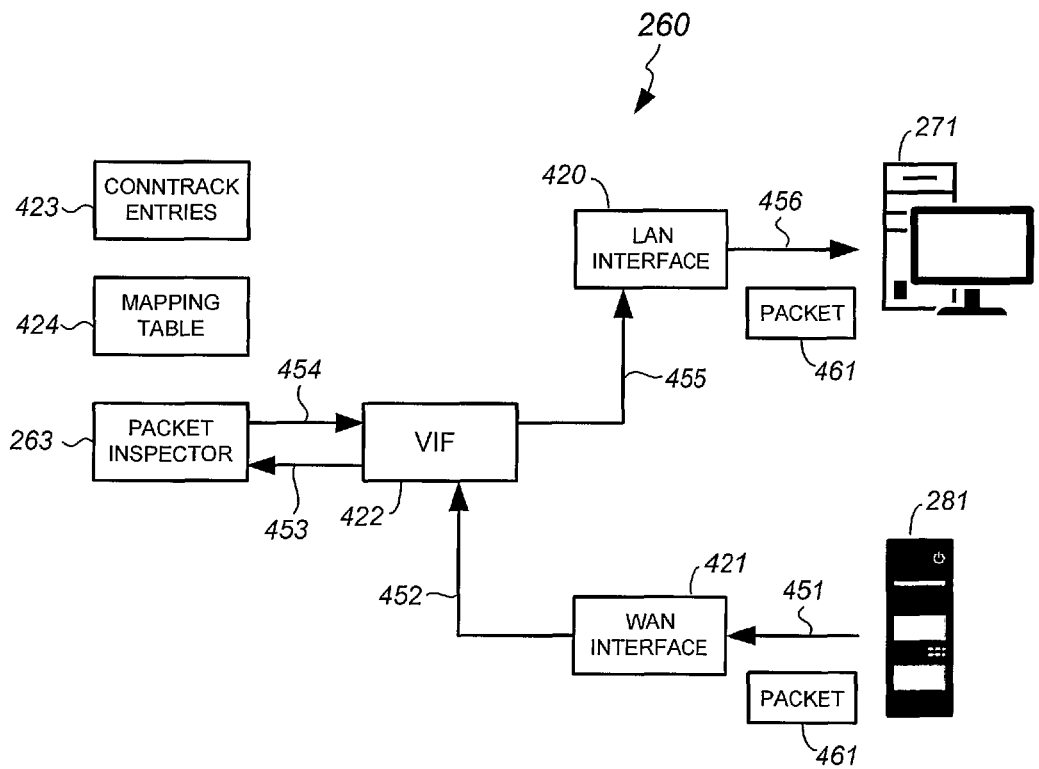
Figure 4:
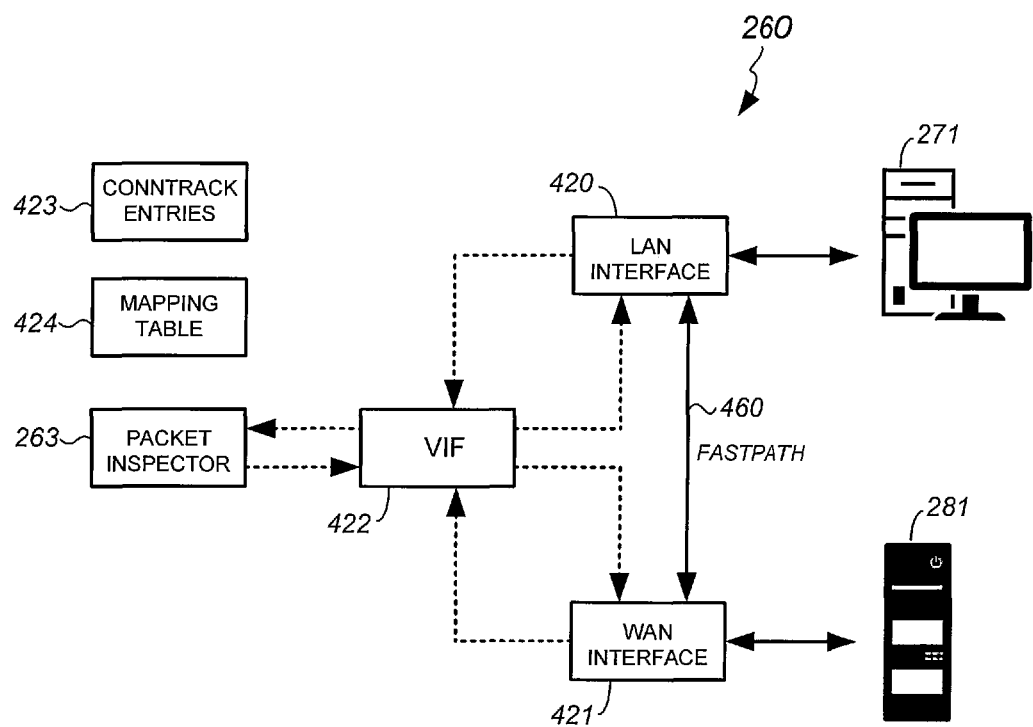

FIGS. 2-4 show logical diagrams that illustrate an example operation of the network security device 260 in accordance with an embodiment of the present invention. The network security device 260 may include physical network interfaces in the form of a LAN interface 420 and a WAN interface 421. The LAN interface 420 and the WAN interface 421 support Fastpath, and may be implemented on one or more network interface cards. More particularly, the network security device 260 has the capability to route packets along a fast path between the LAN interface 420 and the WAN interface 421 to bypass the network stack of the operating system 262 of the network security device 260.

Generally speaking, a network connection is a communication channel between computers. A network flow identifies a communication channel, and comprises one or more packets that have the same 5-tuple, i.e., source Internet Protocol (IP) address, destination IP address, source port, destination port, and protocol. In the example of FIG. 2, connection tracking ("conntrack") entries 423 comprise connection tracking information maintained by the LINUX operating system to keep track of logical network connections or flows.

As its name indicates, a virtual network interface ("VIF") 422 is a virtualized network interface, i.e., implemented in software. In one embodiment, the virtual network interface 422 is implemented using the LINUX tun/tap interface. Generally speaking, a virtual network interface functions similarly to a physical network interface, such as the LAN interface 420 and the WAN interface 421, and can be assigned an IP address. A virtual network interface can send and receive packets to and from local processes, such as the process of the packet inspector 263 running in the memory of the network security device 260.

In one embodiment, the virtual network interface 422 is a local network interface that has no associated physical network interface. That is, the virtual network interface 422 is not bound to any physical network interface. The virtual network interface 422 is configured as a local network interface for receiving packets received from computers on the LAN. More particularly, packets from computers 271 on the LAN, which are received in the LAN interface 420, are routed to the virtual network interface 422 (see arrow 402). The routing of packets from computers on the LAN to the virtual network interface 422 may be made by adding a corresponding route in the LINUX operating system. The LINUX operating system creates an ingress connection tracking entry 423 to note the routing path between the LAN interface 420 and the virtual network interface 422.

An inspection path is a routing path that goes through the virtual network interface 422. In one embodiment, a route is added to route all packets received from computers on the LAN to the virtual network interface 422. As will be more apparent below, a global routing rule may be added to override this added route for marked network connections that will be switched from the inspection path to the fast path. The fast path bypasses the inspection path.

The packet inspector 263 may be implemented as a daemon that is attached to the virtual network interface 422 to allow the packet inspector 263 to write (see arrow 404) and read (see arrow 403) packets to and from the virtual network interface 422. The packet inspector 263 is configured to scan packets for compliance with network policies. The packet inspector 263 may employ conventional algorithms for inspecting packets without detracting from the merits of the present invention.

In one embodiment, all packets from the virtual network interface 422 that are destined to computers on the LAN are routed from the virtual network interface 422 to the LAN interface 420, and all other packets from the virtual network interface 422 are routed to the system default gateway. The routing of packets from the virtual network interface 422 to the LAN interface 420 and to the default system gateway may be made by adding corresponding routes in the LINUX operating system. A global routing rule may be added to override these routes for marked network connections that will be switched from the inspection path to the fast path In the example of FIG. 2, a computer 271 on the LAN has a network connection with a computer 281 on the WAN. A packet 426 transmitted by the computer 271 as part of the network connection is received by the LAN interface 420 at the network security device 260 (see arrow 401). According to the routing instruction to send all packets from the LAN to the virtual network interface 422, the packet 426 is routed from the LAN interface 420 to the virtual network interface 422 (see arrow 402).

The packet inspector 263 reads the packet 426 from the virtual network interface 422 (see arrow 403). The packet 426 has original (i.e., as received at the network security device 260) layer 2, layer 3, and layer 7 information, i.e. 5-tuple information of source IP address, source port, destination IP address, destination port, protocol, and payload. An IP address of a computer on the LAN is also referred to as a "LAN IP address", and an IP address of a computer on the WAN is also referred to as a "WAN IP address." For the packet 426, which is from the computer 271 on the LAN, the source IP address is a LAN IP address.

The packet inspector 263 inspects the payload of the packet 426. After inspection but before writing the packet 426 back to the virtual network interface 422 for routing to its original destination, the packet inspector 263 changes the source IP address of the packet 426 to that of a subnet IP address of the virtual network interface 422. In one embodiment, the packet inspector 263 has different subnet IP addresses for different computers on the LAN. The packet inspector 263 maintains an IP mapping table 424 to map the source IP address of the packet 426 to the subnet IP address of the virtual network interface 422. As can be appreciated, the IP address mapping for different computers on the LAN may also be performed by a module other than the packet inspector 263. The packet inspector 263 thereafter writes the packet 426 (see arrow 404), with its source IP address changed to the subnet IP address of the virtual network interface 422, back to the virtual network interface 422.

As previously noted, a route is added in the LINUX operating system to route to the system default gateway, all packets coming from the virtual network interface 422 that are not destined to a computer on the LAN. The system default gateway is on the WAN-side of the network security device 260. Accordingly, the packet 426 is routed from the virtual network interface 422 to the WAN interface 421 (see arrow 405). The packet 426 is routed to the system default gateway in accordance with the LINUX network address translation, and accordingly exits the WAN interface 421 as expected and eventually arrives at the computer 281. The LINUX operating system also creates an egress connection tracking entry 423 to note the routing path from the WAN interface 421 to the virtual network interface 422 so that reply packets received at the WAN interface 421 are routed to the virtual network interface 422.

Continuing in FIG. 3, a reply packet 461 is transmitted by the computer 281 on the WAN to the computer 271 on the LAN. The reply packet 461 is a reply to the packet 426, and both packets 461 and 426 belong to the same network connection, i.e. of the same flow. The reply packet 461 is received at the WAN interface 421 (see arrow 451) of the network security device 260. The reply packet 461, at the network security device 260, is routed according to the LINUX network address translation. In accordance with the egress connection tracking entry 423 made for the packet 426, the reply packet 461 is routed from the WAN interface 421 to the virtual network interface 422 (see arrow 452). The packet inspector 263 reads the reply packet 461 from the virtual network interface 422 (see arrow 453) and inspects the payload of the reply packet 461.

After inspecting the reply packet 461 but before writing the reply packet 461 back to the virtual network interface 422, the packet inspector 263 performs a lookup of the IP address mapping table 424 to obtain the IP address of the computer 271, and changes the destination IP address of the reply packet 461 to the IP address of the computer 271. The packet inspector 263 thereafter writes the reply packet 461 to the virtual network interface 422 (see arrow 454).

The reply packet 461 coming out of the virtual network interface 422 now has a destination on the LAN. As previously noted, a route is added in the LINUX operating system to route to the LAN interface 420 all packets coming out of the virtual network interface 422 that are destined to a computer on the LAN. Accordingly, the reply packet 461 is routed from the virtual network interface 422 to the LAN interface 420 (see arrow 455). The reply packet 461 exits the LAN interface 420 and eventually arrives at the computer 271 (see arrow 456).

The packet inspector 263 does not necessarily have to inspect all packets of a network connection. That is, the packet inspector 263 may inspect some, but not all, packets of the network connection to make a determination as to whether or not the network connection is in compliance with network policies. Continuing in FIG. 4, after the packet inspector 263 determines that it has inspected enough packets of the network connection between the computers 271 and 281, the network connection can be switched from the inspection path to the fast path (see arrow 460), which in one embodiment is a Fastpath implementation.

In one embodiment, the packet inspector 263 marks network connections that will be switched to the fast path using a specific connection mark. More particularly, each packet of the network connection is marked with the specific connection mark to identify the packet as to be routed along the fast path. In one embodiment, packets of the network connections are marked using the CONNMARK feature of the Netfilter framework of the LINUX operating system.

In one embodiment, to switch marked network connections to the fast path, a global routing rule is added in the LINUX operating system. The global routing rule dictates original routing rules (which do not include the inspection path) are to be followed for marked network connections. As previously noted, routes are added in the LINUX operating system to route all packets from the LAN to the virtual network interface 422, to route packets from the virtual network interface 422 that are destined to a computer on the LAN to the LAN interface 420, and to route packets from the virtual network interface 422 that are not destined to a computer on the LAN to the system default gateway. For marked network connections, the global routing rule overrides the just-mentioned added routes. Accordingly, marked network connections follow the original routing rules, which in this example includes routing through the fast path as applicable.

The packet inspector 263 also deletes existing connection tracking entries 423 for network connections that will be switched from the inspection path to the fast path, and adds a new connection tracking entry 423 that reflects the new routing path for the network connections. More particularly, prior to switching the routing of the network connection to the fast path, there is a connection entry 423 for the routing path between the LAN interface 420 and the virtual network interface 422 and another connection entry 423 for the routing path between the virtual network interface 422 and the WAN interface 421. These connection entries 423 are deleted and replaced by a new connection entry 423 to reflect the new routing path between the LAN interface 420 and the WAN interface 421 for network connections that will be switched to the fast path.

Continuing the example of FIG. 4, the packet inspector 263 decides that it has inspected enough packets of the network connection between the computers 271 and 281 to make a determination as to whether or not the network connection conforms to network policies. Accordingly, the packet inspector 263 marks the network connection with the connection mark. The global routing rule for marked network connections now apply to the network connection, allowing the network connection to be routed as originally intended, without being routed along the inspection path that leads to the packet inspector 263. After the network connection is switched out of the inspection path, the network connection will be re-learned by the fast path implementation, allowing the network connection to be routed through the fast path to achieve higher performance and throughput. In FIG. 4, the dotted arrows represent inspection paths that are no longer taken by marked network connections. Instead, the marked network connections are routed through the fast path (see arrow 460).

Figure 5:
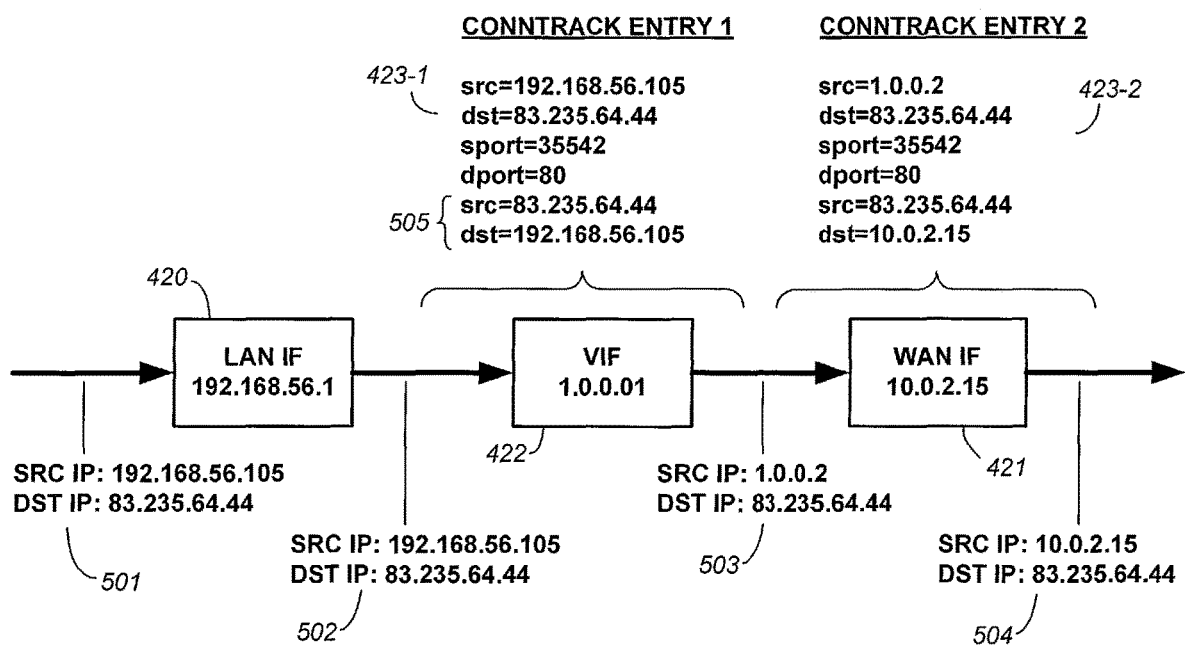
FIG. 5 shows an example routing of a packet along an inspection path in accordance with an embodiment of the present invention.

FIG. 5 shows an example routing of a packet along the inspection path in accordance with an embodiment of the present invention. FIG. 5 shows the processing of the packet as the packet is routed from the LAN interface 420 to the WAN interface 421 along the inspection path.

In the example of FIG. 5, the LAN interface 420 has an IP address of 192.168.56.1, the virtual network interface 422 has an IP address of 1.0.0.01, and the WAN interface has an IP address of 10.0.2.15. The packet, as received at the LAN interface 420 has a source IP address of 192.168.56.105 and a destination IP address of 83.235.64.44 (see 501). The source IP address of the packet, which is in a subnet of the IP address of the LAN interface 420, indicates that the packet is from a computer on the LAN. The packet retains these original source and destination IP addresses (see 502) as the packet is routed to the virtual network interface 422 along the inspection path. The connection tracking entry 423-1 reflects the routing path between the LAN interface 420 and the virtual network interface 422. Note that the bottom part of the connection tracking entry 423-1 (see 505) indicates the route for a reply packet.

The packet inspector 263 reads the packet from the virtual network interface 422, and inspects the payload of the packet. After the inspection, the packet inspector 263 replaces the source IP address of the packet with a subnet IP address of the virtual network interface 422 (see 503), which in the example of FIG. 5 is 1.0.0.2 to reflect the subnet IP that distinguishes the network connection. The connection tracking entry 423-2 reflects the routing path between the virtual network interface 422 and the WAN interface 421. The packet exits the WAN interface 421 with a source IP address of the WAN interface 421, and the original destination IP address of the packet as received (see 504). This allows the packet the packet to be delivered to its original destination. The reply packet goes in the opposite direction: entering the WAN interface 421, following the LINUX network address translation to be routed to the virtual network interface 422, following routing rules to be routed to the LAN interface 420, and exiting the LAN interface 420 to be forwarded to the computer on the LAN.

Figure 6:
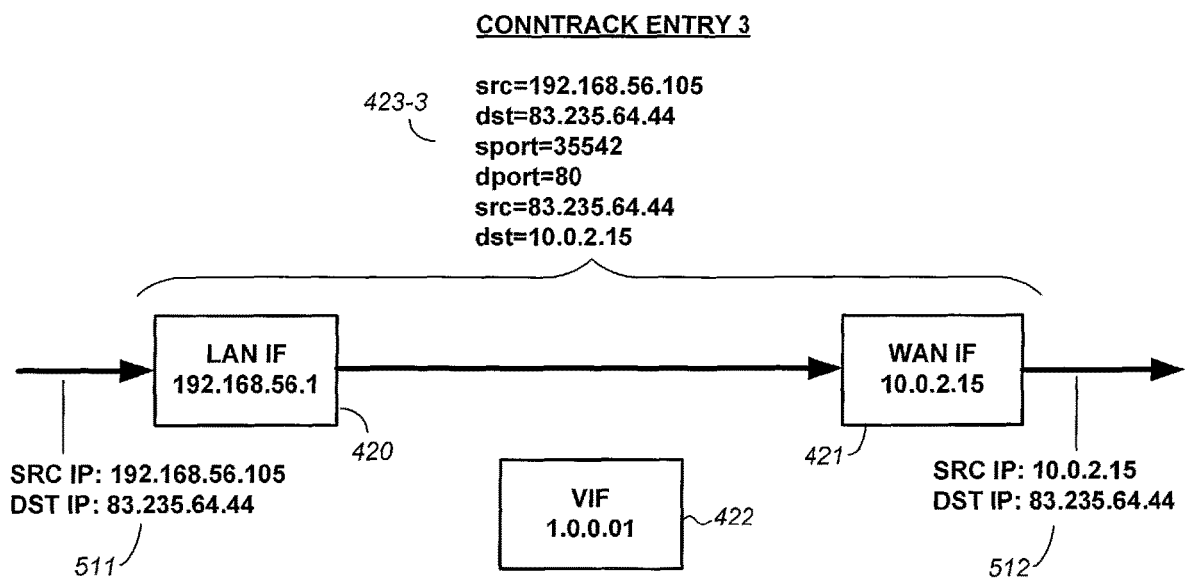
FIG. 6 shows example switching of a network connection from an inspection path to a fast path in accordance with an embodiment of the present invention.

FIG. 6 shows example switching of a network connection from an inspection path to a fast path in accordance with an embodiment of the present invention. The example of FIG. 6 follows the example of FIG. 5, after the packet inspector 263 has inspected sufficient number of packets of the network connection. In the example FIG. 6, the packet inspector 263 deletes connection entries 423-1 and 423-2 (shown in FIG. 5) of the network connection to be switched to the fast path, adds a new connection entry 423-3 that reflects the original routing and network address translation of the network connection, and marks the network connection for switching to the fast path. In accordance with the global routing rule to follow original routing for marked network connections, packets of the network connection will no longer follow the inspection path that includes the virtual network interface 422. After one or more packets to allow the Fastpath implementation to learn the network connection, subsequent packets of the network connection entering the LAN interface 420 will be routed through the fast path to the WAN interface 421 without going through the network stack of the LINUX operating system.

Figure 7:
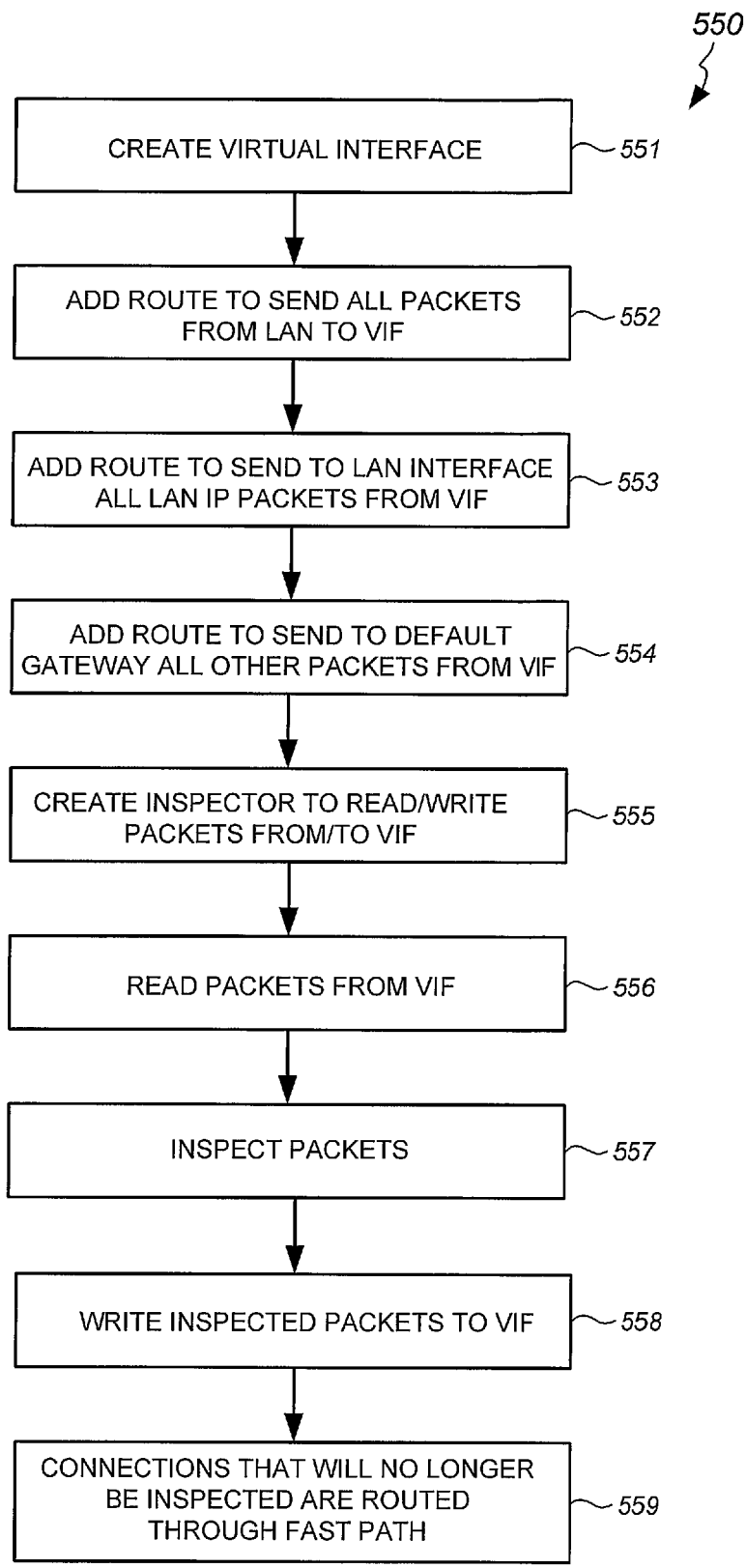
FIG. 7 shows a flow diagram of a method of inspecting network traffic on accelerated platforms in accordance with an embodiment of the present invention.

FIG. 7 shows a flow diagram of a method 550 of inspecting network traffic on accelerated platforms in accordance with an embodiment of the present invention.

In the example of FIG. 7, a virtual network interface that is not bound to a physical network interface is created (step 551). A first route is added to send all packets from computers on a LAN to the virtual network interface (step 552). A second route is added to send to a LAN interface all packets from the virtual network interface that are destined to computers on the LAN (step 553). A third route is added to send to a system default gateway all other packets from the virtual network interface (step 554). More particularly, in accordance with the third route, all packets from the virtual network interface that are not destined to computers on the LAN are sent to the system default gateway. Packets that are sent to the system default gateway are routed to the WAN interface.

A packet inspector, which may be implemented as a daemon, is created to read and write packets from and to the virtual network interface (step 555). The packet inspector reads packets from the virtual network interface (step 556), inspects payloads of the packets (step 557), and thereafter writes the packets to the virtual network interface (step 558). Network connections that the packet inspector will no longer inspect are routed through the fast path (step 559).

Figure 8:
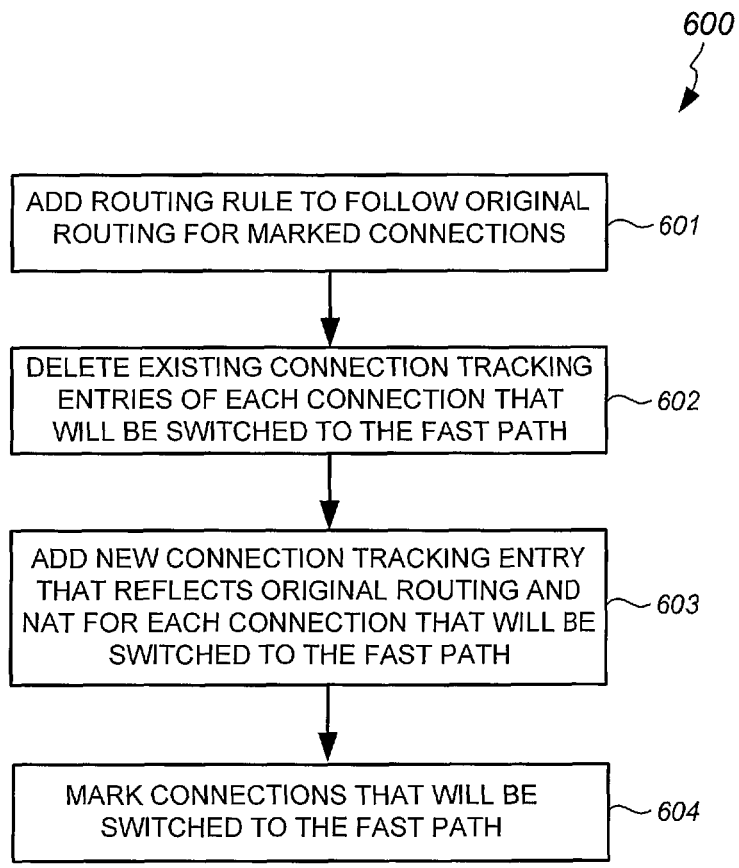
FIG. 8 shows a flow diagram of a method of switching network connections from an inspection path to a fast path in accordance with an embodiment of the present invention.

FIG. 8 shows a flow diagram of a method 600 of switching network connections from an inspection path to a fast path in accordance with an embodiment of the present invention. The inspection path is a routing path that includes a network inspector for inspecting network traffic. In the example of FIG. 8, a network connection is switched from an inspection path to a fast path when the network inspector has inspected a sufficient number of packets of the network connection.

In the example of FIG. 8, a global routing rule to follow original routing for marked network connections is added (step 601). This global routing rule typically only has to be added once, such as during initialization of the network security device 260. Existing connection tracking entries of network connections that will be switched to the fast path are deleted (step 602). A new connection tracking entry that reflects original routing and network address translation is added for each network connection that will be switched from the inspection path to the fast path (step 603). Network connections that will be switched from the inspection path to the fast path are marked (step 604).

Figure 9:
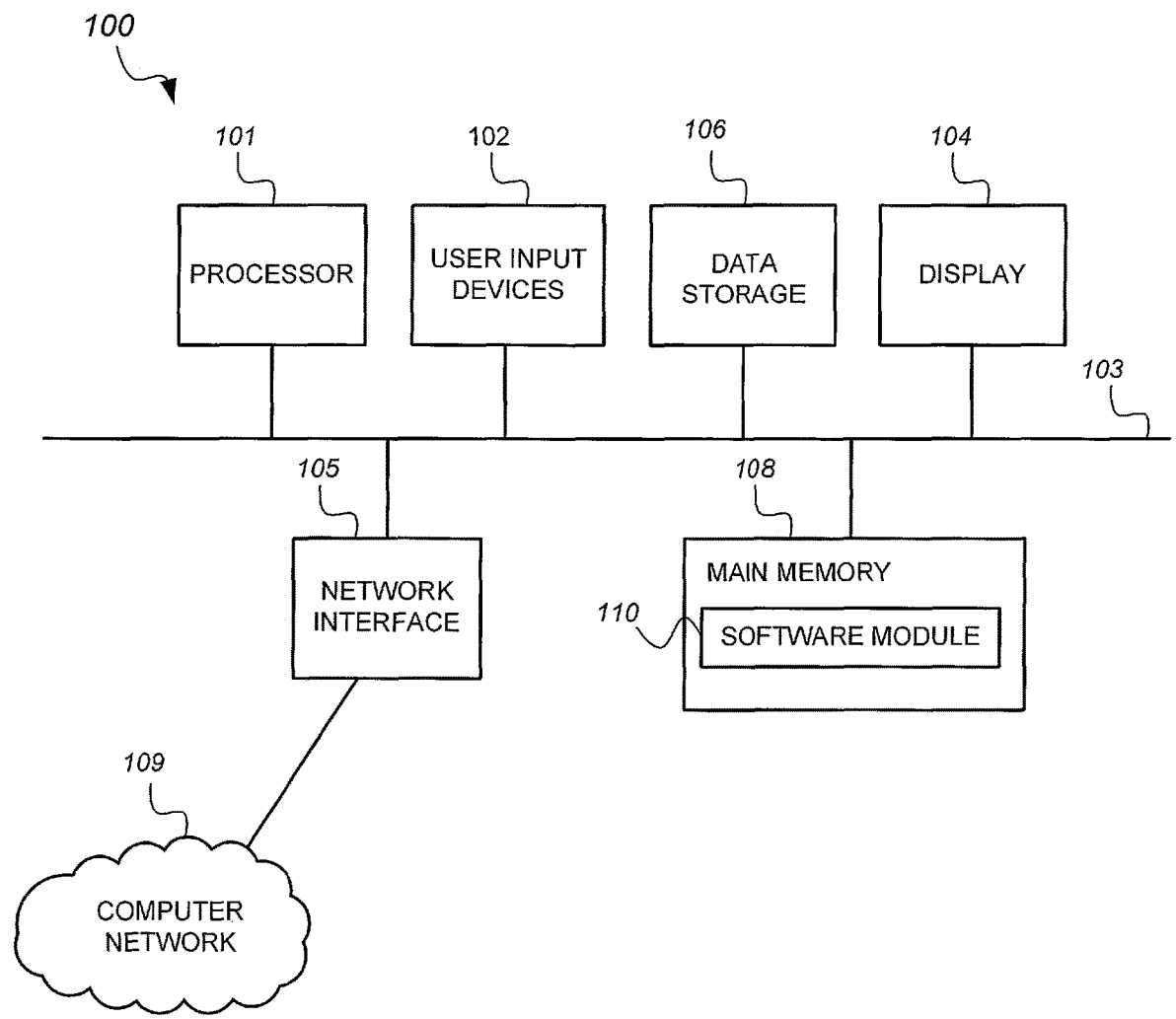
FIG. 9 shows a logical diagram of a computer system that may be employed with embodiments of the present invention.

Referring now to FIG. 9, there is shown a logical diagram of a computer system 100 that may be employed with embodiments of the present invention. The computer system 100 may be employed as a network security device or other computer described herein. The computer system 100 may have fewer or more components to meet the needs of a particular application. The computer system 100 may include one or more processors 101. The computer system 100 may have one or more buses 103 coupling its various components. The computer system 100 may include one or more user input devices 102 (e.g., keyboard, mouse), one or more data storage devices 106 (e.g., hard drive, optical disk, solid state drive), a display monitor 104 (e.g., liquid crystal display, flat panel monitor), a computer network interface 105 (e.g., network adapter, modem), and a main memory 108 (e.g., random access memory). The computer network interface 105 may be coupled to a computer network 109, which in this example includes the Internet.

The computer system 100 is a particular machine as programmed with one or more software modules 110, comprising instructions stored non-transitory in the main memory 108 for execution by the processor 101 to cause the computer system 100 to perform corresponding programmed steps. An article of manufacture may be embodied as computer-readable storage medium including instructions that when executed by the processor 101 cause the computer system 100 to be operable to perform the functions of the one or more software modules 110.

In one embodiment where the computer system 100 is configured as a network security device, the software modules 110 comprise an operating system and a packet inspector.

Systems and methods for inspecting network traffic on an accelerated platform have been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method of inspecting network traffic on accelerated platforms, the method comprising:
providing a virtual network interface on a network security device, the network security device comprising a local area network (LAN) interface and a wide area network (WAN) interface, the network security device including a capability to route packets from the LAN interface to the WAN interface along a fast path that bypasses a network stack of an operating system of the network security device;
receiving a packet of a network connection at the LAN interface of the network security device;
routing the packet from the LAN interface to the virtual network interface;
reading the packet from the virtual network interface;
inspecting a payload of the packet for compliance with a network policy;
after inspecting the payload of the packet, writing the packet back to the virtual network interface;
routing the packet from the virtual network interface to the WAN interface; and
after inspecting a number of packets of the network connection, switching remaining packets of the network connection from an inspection path that includes the virtual network interface to the fast path.

2. The method of claim 1, further comprising:
receiving a reply packet at the WAN interface;
routing the reply packet to the virtual network interface;
reading the reply packet from the virtual network interface;
inspecting a payload of the reply packet for compliance with the network policy;
after inspecting the payload of the reply packet, writing the reply packet back to the virtual network interface; and
routing the reply packet from the virtual network interface to the LAN interface.

3. The method of claim 1, further comprising:
before writing the packet back to the virtual network interface, replacing a source Internet protocol (IP) address of the packet with a first IP address of the virtual network interface.

4. The method of claim 3, wherein the first IP address is a subnet IP address of the virtual network interface.

5. The method of claim 3, wherein the first IP address of the virtual network interface is different from a second IP address of the virtual network interface, the first IP address of the virtual network interface being for the network connection and the second IP address of the virtual network interface being for another, different network connection.

6. The method of claim 1, wherein the operating system is a LINUX operating system.

7. The method of claim 1, wherein the network security device is a home router.

8. A network security device comprising:
a first physical network interface;
a second physical network interface;
at least one processor; and
a memory storing instructions that when executed by the at least one processor cause the network security device to:
receive a packet of a network connection at the first physical network interface;
route the packet to a virtual network interface;
read the packet from the virtual network interface;
inspect the packet;
write the packet to the virtual network interface after inspection of the packet;
route the packet from the virtual network interface to the second physical network interface; and
after inspecting a number of packets of the network connection, switch routing of remaining packets of the network connection to a fast path between the first physical interface and the second physical interface, wherein the fast path bypasses a network stack of an operating system of the network security device and bypasses packet inspection.

9. The network security device of claim 8, wherein the first physical network interface is a local area network (LAN) interface and the second physical network interface is a wide area network (WAN) interface.

10. The network security device of claim 9, wherein the instructions stored in the memory, when executed by the at least one processor, cause the network security device to:
receive a reply packet at the WAN interface;
route the reply packet from the WAN interface to the virtual network interface;
read the reply packet from the virtual network interface;
inspect the reply packet;
write the reply packet to the virtual network interface after inspecting the reply packet; and
route the reply packet from the virtual network interface to the LAN interface.

11. The network security device of claim 9, wherein the LAN interface is connected to a LAN and the packet is originated by a computer on the LAN.

12. The network security device of claim 11, wherein the packet is destined to a computer on the Internet.

13. The network security device of claim 8, wherein the operating system is a LINUX operating system.

14. The network security device of claim 8, wherein the network security device is a home router.

15. A method of inspecting network traffic on accelerated platforms, the method comprising:
   providing a virtual network interface on a network security device that has a capability to route packets from a first physical network interface to a second physical network interface along a fast path that bypasses a network stack of an operating system of the network security device;
   receiving a packet of a network connection on the network security device, the packet having an original destination network address as received on the network security device;
   routing the packet to the virtual network interface;
   receiving the packet from the virtual network interface;
   inspecting the packet;
   forwarding the packet to the virtual network interface after inspecting the packet;
   routing the packet to the original destination network address; and
   after inspecting one or more packets of the network connection, bypassing the virtual network interface and packet inspection by routing subsequently received packets of the network connection along the fast path.

16. The method of claim 15, further comprising:
   before routing the packet to the original destination address, changing a source address of the packet to a network address of the virtual network interface.

17. The method of claim 15, further comprising:
   receiving a reply packet of the network connection;
   routing the reply packet to the virtual network interface;
   inspecting the reply packet;
   forwarding the reply packet to the virtual network interface after inspecting the reply packet; and
   routing the reply packet to a destination network address of the reply packet.

18. The method of claim 15, wherein the packet is originated by a computer on a local area network (LAN), the first physical interface is a LAN interface, the packet is received at the LAN interface, the second physical interface is a wide area network (WAN) interface, and the packet is routed to the original destination network address by exiting the WAN interface.

19. The method of claim 18, wherein the operating system is a LINUX operating system.

20. The method of claim 19, wherein the network security device is a home router of a residence.

* * * * *